(12) United States Patent
Graham

(10) Patent No.: US 6,388,580 B1
(45) Date of Patent: May 14, 2002

(54) AUTOMOBILE UNSAFE FOLLOWING DISTANCE WARNING SYSTEM

(76) Inventor: Rudolph Graham, 12415 Imperial Hwy. 10, Norwalk, CA (US) 90650

( * ) Notice: Subject to any disclaimer, the term of this patent is extended or adjusted under 35 U.S.C. 154(b) by 0 days.

(21) Appl. No.: 09/121,358

(22) Filed: Jul. 23, 1998

(51) Int. Cl.⁷ .................................................. G08G 1/16
(52) U.S. Cl. ...................... 340/903; 340/904; 340/933; 340/435
(58) Field of Search ................................ 340/903, 436, 340/435, 479, 904, 933, 942, 943

(56) References Cited

U.S. PATENT DOCUMENTS 5,453,740 A * 9/1995 Gallagher et al. .......... 340/903
5,457,439 A * 10/1995 Kuhn ......................... 340/435

* cited by examiner

Primary Examiner—Daryl Pope

(57) ABSTRACT

An automobile unsafe following distance warning system, located in an installed vehicle, for assessing whether a safe following distance is present between the installed vehicle and a front vehicle which is traveling immediately in front of the installed vehicle, comprising a sensor unit for determining the distance between the front vehicle and the installed vehicle, and for determining the speed of the installed vehicle. A threshold safe following distance is determined from the measured speed of the installed vehicle. An initial warning light is illuminated to notify the driver that the actual following distance is less than the threshold safe following distance. A severe warning light, a buzzer, and a vibration unit are activated to notify the driver that the actual following distance is much less than the threshold following distance and that a dangerous situation exists.

1 Claim, 2 Drawing Sheets

AUTOMOBILE UNSAFE FOLLOWING DISTANCE WARNING SYSTEM

FIELD OF THE INVENTION

The invention relates to an automobile unsafe following distance warning system. More particularly, the invention relates to a system for determining when the automobile in which the invention is installed is following too closely behind a vehicle immediately in front thereof.

BACKGROUND OF THE INVENTION

One of the most frequent causes of vehicle accidents is the failure of a vehicle to maintain a safe distance behind another vehicle which would allow the vehicle to stop before striking the vehicle in front, should said front vehicle suddenly stop. The safe distance required to prevent such a rear-end collision depends on the reaction time of the vehicle driver before the brake pedal is actually depressed, and the braking distance traversed by the vehicle before it comes to a complete stop after the braking pedal has been depressed. Both of these factors vary according to the surrounding circumstances at the time of driving.

While safe following distances do vary with conditions, the reality is that many drivers habitually follow other vehicles at a distance which is unsafe even under optimal driving conditions. Thus, a need exists to bring this unsafe condition to the driver's attention, and hopefully train the driver to maintain a safe following distance at all times.

SUMMARY OF THE INVENTION

The present invention relates to a system for determining when the automobile in which the invention is installed is following too closely behind a vehicle immediately in front thereof.

In accordance with the invention, there is provided a sensor which is mounted in the front bumper of the installed vehicle. The sensor comprises a range-finder which determines the instantaneous distance between the front vehicle and the installed vehicle. The sensor also comprises a speed sensor which determines the current speed of the installed vehicle. The instantaneous distance between the vehicles and the current speed of the installed vehicle are factored to determine if a safe following distance is present.

Further in accordance with the invention, the driver of the installed vehicle is warned when a safe following distance is not present by means of a visual warning indication.

Still further in accordance with the invention, the driver of the installed vehicle is warned by an audible alarm and/or a vibrating device when the detected following distance and installed vehicle speed indicate a grave condition or imminent collision.

The invention is an automobile unsafe following distance warning system, located in an installed vehicle, for assessing whether a safe following distance is present between the installed vehicle and a front vehicle which is traveling immediately in front of the installed vehicle, comprising a sensor unit for determining the distance between the front vehicle and the installed vehicle, and for determining the speed of the installed vehicle. A threshold safe following distance is determined from the measured speed of the installed vehicle. An initial warning light is illuminated to notify the driver that the actual following distance is less than the threshold safe following distance. A severe warning light, a buzzer, and a vibration unit are activated to notify the driver that the actual following distance is much less than the threshold following distance and that a dangerous situation exists.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
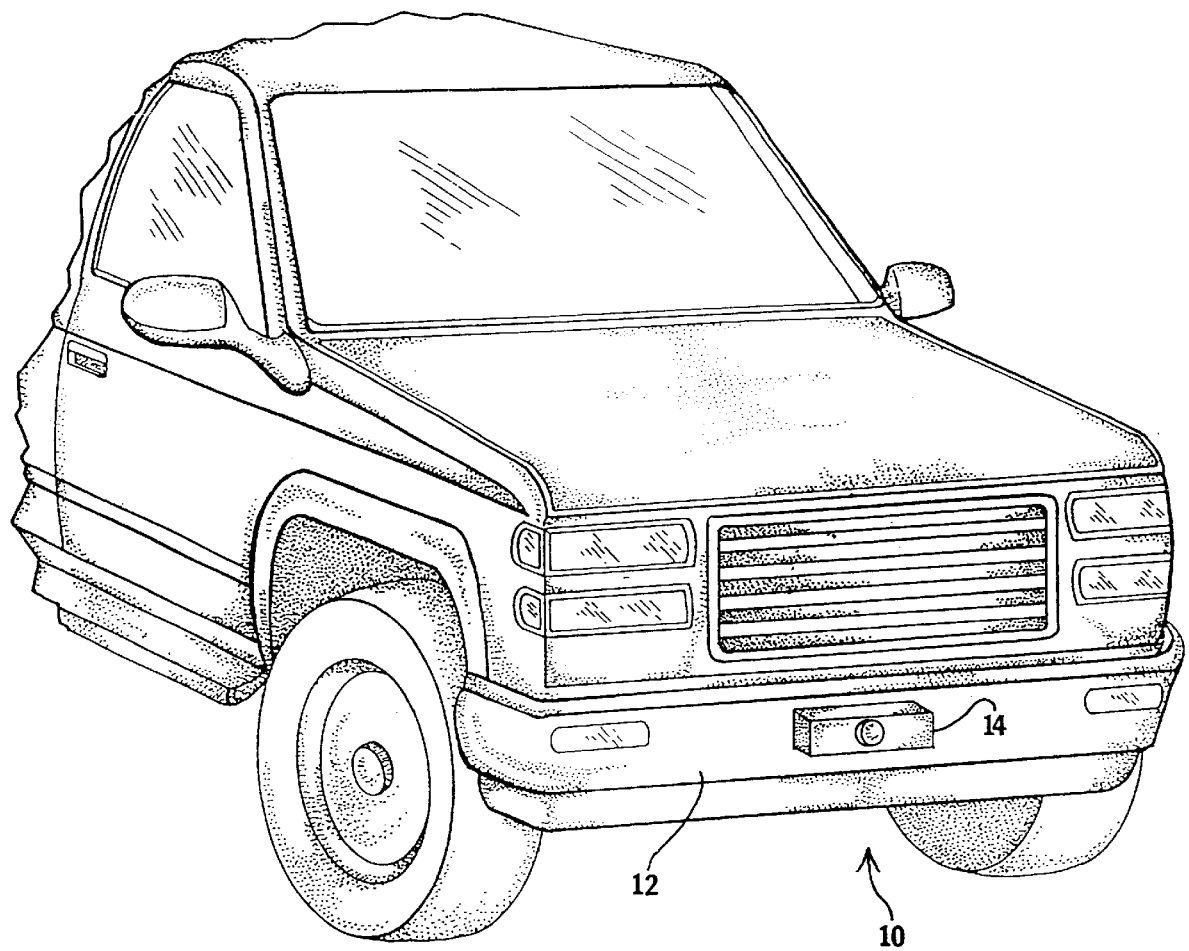
FIG. 1 is a diagrammatic perspective view, illustrating an automobile having the invention installed therein.

FIG. 1 illustrates an automobile 10 in which a following distance warning system is installed, said automobile also known herein as an installed automobile. Within the present description a front automobile refers to an automobile traveling immediately in front of the installed automobile. Frequent reference is made to the front vehicle, since accomplishing the goals of the present invention involves assessing the distance between the installed automobile and the front automobile.

The automobile has a front bumper 12. A sensor unit 14 is installed at the front bumper 12. The sensor unit 14 contains a range-finder device which uses audible or optical means to determine the distance of the nearest vehicle traveling immediately in front of the automobile 10. The sensor unit 14 also has a speed sensor for determining the current speed of the automobile 10.

Figure 2:
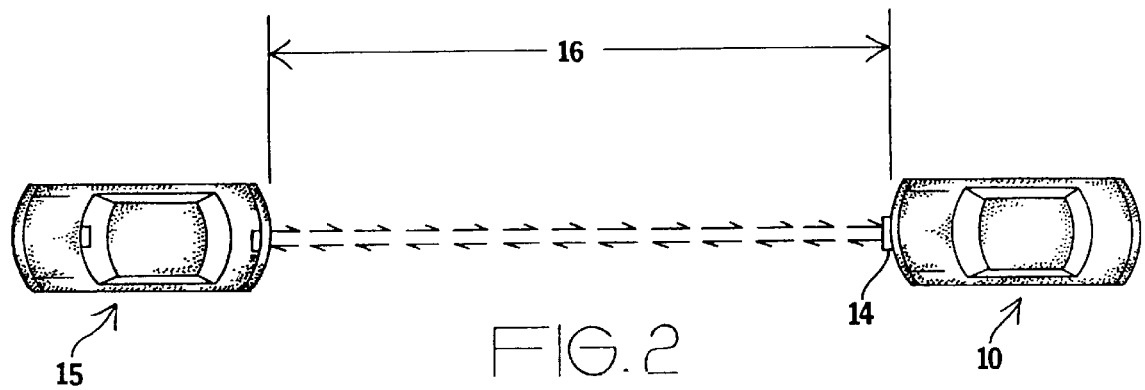
FIG. 2 is a top plan view, illustrating the automobile with the system installed therein and a front automobile, whereas the system is assessing the distance between the front automobile and the following automobile.

With reference to FIG. 2, the aforementioned front vehicle 15 is, shown traveling a distance 16 in front of the installed automobile 10. Said distance is known as a following distance. The sensor unit 14 determines this following distance through conventional range-finding technology. In order to determine if the following distance is a safe following distance, the sensor unit 14 also determines the speed of the automobile 10.

In general, the determination of whether a following distance is safe is completely speed dependent. When in bumper to bumper traffic, the following distance can be minimal. However, as the vehicle speed increases, the following distance must increase accordingly. The safe following distance can easily be calculated from the current vehicle speed through conventional and well known speed-distance calculation techniques to determine a threshold safe following distance.

Figure 3:
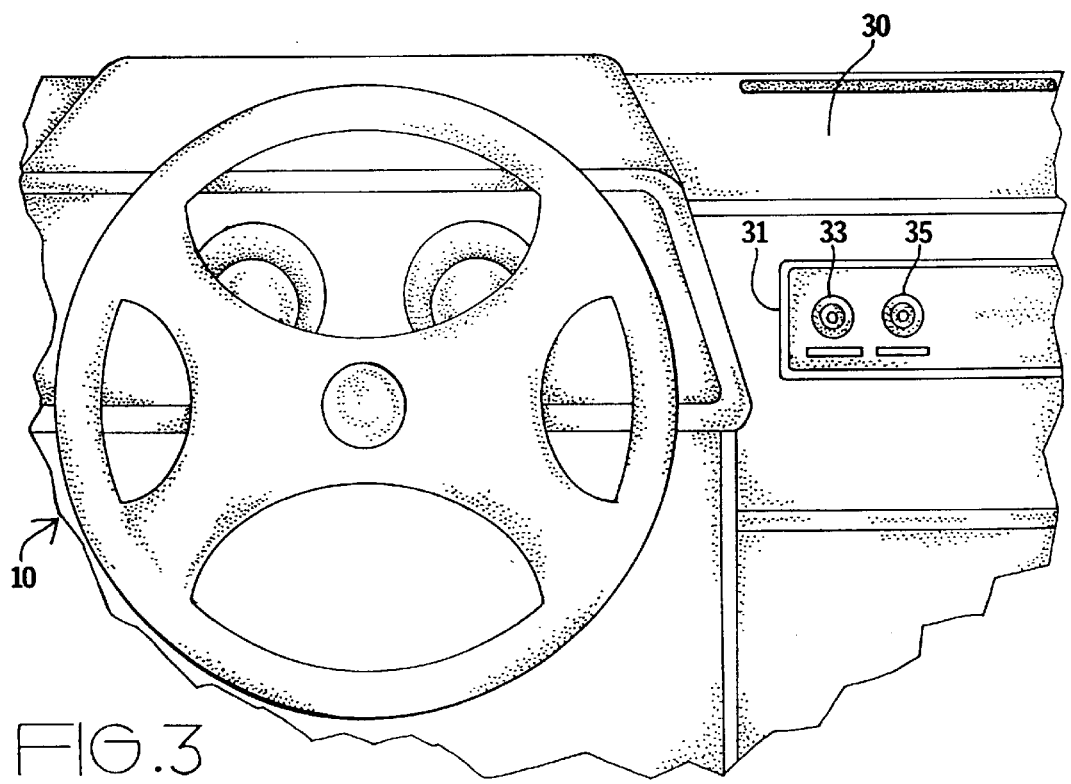
FIG. 3 is a diagrammatic perspective view, illustrating the warning unit according to the present invention located on the dashboard of the automobile.

FIG. 3 illustrates an automobile dashboard 30 within the automobile. A warning unit 31 is located on said dashboard 30. With further reference to FIG. 3, when it is determined that the actual following distance is less than the threshold safe following distance, an initial warning light 33 is illuminated. The illumination of the initial warning light 33 is to inform the driver that they are traveling at an unsafe following distance. The driver should then adjust the speed of the automobile 10 accordingly, the driver reducing said speed until the initial warning light 33 turns off.

When the actual following distance, as determined by the sensor unit 14 is greatly less than the safe following distance, a severe warning light 35 is illuminated, along with an alert buzzer and vibration device which is located proximally to the driver. Often when the driver is following at an extremely short following distance, it is because the driver is temporarily distracted, drowsy, or has actually fallen asleep. Thus, the alert buzzer and vibration device can summon the driver's attention to the dangerous condition. To further aid in achieving the driver's attention, the severe warning light 35 should produce a much higher intensity illumination than the initial warning light 33.

In conclusion, herein is presented a system for determining whether the installed automobile is following a front vehicle at a safe following distance. If a safe following distance is not present, an initial warning device is illuminated. If the actual following distance is greatly less than the safe following distance, then a severe warning light, as well as buzzer and vibration devices are activated to alert the driver to the dangerous condition.

What is claimed is:

1. An automobile unsafe following distance warning system, installed within an installed vehicle, for assessing whether the installed vehicle is at a safe following distance behind a front vehicle, consisting of:

a sensor unit, for determining the actual following distance between the front vehicle and the installed vehicle, and for determining the current speed of the installed vehicle;

a warning unit, located within the automobile, for determining a threshold following distance based upon the current speed of the vehicle;

an initial warning light located on the warning unit, for illuminating to notify the driver that he is traveling at a following distance that is less than the threshold following distance;

a severe warning light, for notifying the driver when the actual following distance is much less than the threshold following distance and that a dangerous situation exists;

a buzzer which is activated when the sever warning light is activated to alert the driver of the dangerous situation; and a vibration device, located inside the automobile proximal to the driver, for aiding the sever warning light and buzzer in alerting the driver of the dangerous situation wherein the severe warning light is much greater in illumination intensity than the initial warning light.

* * * * *